United States Patent [19]

Koch

[11] Patent Number: 4,485,135
[45] Date of Patent: Nov. 27, 1984

[54] AMBIENT TEMPERATURE CURE OF ELASTOMERIC ARTICLES HAVING A DEFORMITY THEREIN

[75] Inventor: Russell W. Koch, Hartville, Ohio

[73] Assignee: The Firestone Tire & Rubber Company, Akron, Ohio

[21] Appl. No.: 477,453

[22] Filed: Mar. 21, 1983

[51] Int. Cl.$^3$ .................. F16L 11/12; B32B 25/04
[52] U.S. Cl. ...................... 428/36; 138/104; 152/353 R; 152/374; 152/DIG. 12; 156/116; 156/326; 428/411.1; 428/413; 428/423.3; 428/423.9; 428/424.6; 428/424.7; 428/424.8; 428/492; 428/521; 428/523
[58] Field of Search .............. 428/423.9, 31, 424.8, 428/36, 79, 187, 424.7, 424.6, 423.5, 411, 413, 520–522, 447, 474.4, 492, 523, 423.3; 138/104; 116/278; 152/353 R, DIG. 12, 374; 156/116, 326

[56] References Cited

U.S. PATENT DOCUMENTS

| | | | |
|---|---|---|---|
| 3,644,256 | 2/1972 | Broisman | 269/29.3 |
| 3,718,587 | 2/1973 | Bhakuni | 252/8.6 |
| 3,755,261 | 8/1973 | VanGulick | 260/77.5 |
| 3,779,794 | 12/1973 | DeSantis | 117/72 |
| 3,834,934 | 9/1974 | Broisman | 117/76 T |
| 3,888,831 | 6/1975 | Kogon | 260/77.5 |
| 3,966,530 | 6/1976 | Cutts et al. | 156/308 |
| 3,991,255 | 11/1976 | Blaskiewicz et al. | 428/425 |
| 4,085,283 | 4/1978 | Otter et al. | 260/248 |
| 4,125,522 | 11/1978 | Becker | 528/61 |
| 4,136,219 | 1/1979 | Odam et al. | 427/385 B |
| 4,143,454 | 3/1979 | Utsunomiya | 29/460 |
| 4,158,378 | 6/1979 | Pearson et al. | 152/353 R |
| 4,240,852 | 12/1980 | Gomberg | 156/96 |
| 4,300,970 | 11/1981 | Honda et al. | 156/244.11 |
| 4,311,181 | 1/1982 | Hausch | 428/36 |
| 4,327,138 | 4/1982 | Hausch | 428/36 |
| 4,352,704 | 10/1982 | Williams | 156/125 |
| 4,399,852 | 8/1983 | Hausch | 428/36 |
| 4,401,145 | 8/1983 | Hausch | 152/353 R |

FOREIGN PATENT DOCUMENTS

1352645  5/1971  United Kingdom .

OTHER PUBLICATIONS

"Room Temperature Vulcanizing Adhesive Based on Ethylene–Propylene–Diene Terpolymer," Cantor, Uniroyal, Paper No. 18, 10/10/73.

Hughson Chemical Division, Lord Corporation, Products TS–2682–71.

Primary Examiner—Marion E. McCamish
Assistant Examiner—Nancy A. B. Swisher
Attorney, Agent, or Firm—Daniel N. Hall

[57] ABSTRACT

The repair of a reinforced elastomer article having a deformity such as a cut, cavity, or an aperture therein relates to utilizing an amine curable polymer or prepolymer and a cured elastomer patch. The deformity in the elastomer as well as the areas juxtaposition to the patch are coated with a treating agent. The amine curable polymer or prepolymer applied to the patch area has no rubber filler therein and is cured at ambient temperature. The amine curable polymer or prepolymer applied to the cut, cavity or to the aperture does have a rubber filler therein and is also cured at ambient temperature. One area of use is in the repair of tires.

21 Claims, 3 Drawing Figures

AMBIENT TEMPERATURE CURE OF ELASTOMERIC ARTICLES HAVING A DEFORMITY THEREIN

TECHNICAL FIELD

The present invention relates to a composition and method for repairing elastomer articles having a deformity therein such as a cut, or a hollow such as a cavity, or aperture. More specifically, the present invention with regard to the cavity and aperture relates to the utilization of a patch in association with the elastomer article and an amine curable polymer or prepolymer which is cured at ambient temperatures. Said polymer or prepolymer has a rubber filler therein when used to fill a non-patch area.

BACKGROUND ART

Heretofore, reinforced rubber articles such as tires having a cut or opening therein have been repaired generally by filling the cut with rubber. Such a repair required a source of heat to cure the rubber and the formed repair usually had a short life. If the opening extended through some of the cords or through the entire tire, a patch was generally used. That is, an uncured rubber compound was first added to the hole and then cured with heat. Next, the patch area, for example the inside of the tire, was buffed. An uncured patch was then positioned and cured with heat. This repair route was not only long and tedious, but required the utilization of heat, usually a tire mold, and the like. Thus, except for a chemical cure patch, an on-the-spot or in-situ repair could not be made, nor could repair be made at an ambient temperature. Moreover, the chemical patch method generally resulted in low or poor adhesion.

Considering the prior art, U.S. Pat. Nos. 3,755,261 to VanGulick; 3,888,831 to Kogon; 3,834,934 to Broisman, 3,644,256 also to Broisman; and 3,718,587 to Bhakuni relate to amine curable curing agents, amine curable polymers, or R-F-L type adhesives. However, these patents lack any suggestion of applicants' treating agent or repair of an elastomer article utilizing an amine curable polymer or prepolymer having a rubber filler therein.

U.S. Pat. No. 3,779,794 to DeSantis relates to a moisture-curable polyurethane sealant primer system, whereas U.S. Pat. No. 4,085,283 to Den Otter relates to flame retardants utilized in cyanuric acid derivatives. Hughson Chemical Division, Lord Corporation, Product No. TS-2682-71 relates to a surface primer for elastomeric substances utilizing a proprietary compound thought to be mono- or dichloroisocyanuric acid. An article entitled "Room Temperature Vulcanizing Adhesive Based on Ethylene-Propylene-Diene Terpolymer," Cantor, Uniroyal, Paper No. 18 presented to the Division of Rubber Chemistry of the American Chemical Society, Denver, Colo., Oct. 10, 1973, relates to various oxidants which effect ambient temperature cures of EPDM.

U.S. Pat. No. 4,136,219 to Oldam relates to a polyurethane paint which is applied to vulcanized rubbers. British Pat. No. 1,352,645 relates to a polyurethane paint which is applied to vulcanized rubbers.

British Pat. No. 1,352,645 relates to N-halogen sulphonamide treating agents which halogenize surfaces of synthetic and/or natural rubbers.

U.S. Pat. No. 4,125,522 to Becker relates to a polyurethane adhesive, whereas U.S. Pat. No. 3,966,530 to Cutts relates to triazoline diones which are utilized in lieu of chlorinated or halogenated donors for treating elastomeric surfaces to improve adhesion.

U.S. Pat. No. 4,143,454 to Utsunomiya relates to a method of attaching connecting parts of an offshore structure wherein a liquid rubber is applied over a treating solution which may contain a halogen molecule. As such, this reference lacks applicants' treating agent, an elastomer article having a patch thereon, as well as an amine curable polymer or prepolymer having a rubber filler therein.

U.S. Pat. No. 4,158,378 to Pearson relates to a cured rubber tire having a specific polyurethane therein and to a chlorine water treatment. Hence, Pearson also fails to teach or suggest applicants' recited treating agent as well as patched article.

U.S. Pat. No. 3,991,255 to Blaskjiewicz relates to the adhesion of a polyurethane to an EPDM surface utilizing various adhesives. However, Blaskjiewicz does not use his treating agent to form a treating layer and utilizes elevated temperatures.

U.S. Pat. No. 4,300,970 to Honda does not disclose amine curable resins or an ambient temperature cure.

U.S. Pat. No. 4,240,852 to Gomberg relates only to the use of a cyanoacrylate adhesive.

U.S. Pat. No. 4,352,704 to Williams relates to applying tire tread to a tire. This patent lacks any suggestion of applicants' treating agent or the repair of a tire aperture.

U.S. Pat. No. 4,327,138 to Hausch fails to disclose a cured rubber patch in repairing a rubber article.

One prior art method of repairing a tire relates to the utilization of a proprietary compound, thought to be a mixture of rubber and which is applied to the aperture and then cured. In general, very poor adhesion results and heat is required.

DISCLOSURE OF INVENTION

It is therefore an aspect of the present invention to provide a reinforced, repaired elastomer article having an opening therein such as a cut, or a hollow such as a cavity, or aperture utilizing a cured rubber patch and an amine curable polymer or prepolymer.

It is yet another aspect of the present invention to provide a reinforced, repaired elastomer article, as above, in which said amine curable polymer or prepolymer fills said opening or said hollow and has a rubber filler therein.

It is a still further aspect of the present invention to provide a reinforced, repaired elastomer article, as above, in which said amine curable polymer or prepolymer resides in said patch area and does not contain any rubber filler therein.

It is yet another aspect of the present invention to provide a reinforced, repaired elastomer article, as above, in which the repair is made at ambient temperatures.

It is a still further aspect of the present invention to provide a reinforced, repaired elastomer article, as above, in which a layer of a treating agent resides on said opening or said hollow and in an area between said patch and said article.

It is a still further aspect of the present invention to provide a reinforced, repaired elastomer article, as above, wherein said repaired elastomer article is a tire, a conveyor belt, and the like and wherein said repaired area reduces the hardness of said polymer or prepolymer.

It is yet another aspect of the present invention to provide a reinforced, repaired elastomer article, as above, wherein said cured rubber patch is located juxtaposition to one end of said hollow.

It is yet another aspect of the present invention to provide a reinforced, repaired elastomer article, as above, wherein said patch has one or more cords therein.

It is yet another aspect of the present invention to provide a repaired elastomer article, as above, wherein said amine curable polymer or prepolymer is a urethane polymer or polymer, wherein said treating agent is trichloro-s-isocyanuric acid, and wherein said rubber filler is cured rubber particles.

These and other aspects of the present invention will become apparent from the following description of the invention.

In general, one aspect of the invention is a repaired, reinforced elastomer article, comprising:

(a) the elastomer article, said elastomer having unsaturated groups therein, said article being cured and having a hollow therein;

(b) a cured patch, said patch located juxtaposition to said hollow;

(c) a treating agent, said treating agent coating said hollow and said article in said patch juxtaposition area, said treating agent selected from the group consisting of N-halohydantoins, N-haloamides, N-haloimides, and combinations thereof;

(d) an amine curable polymer or prepolymer, said amine curable polymer or prepolymer substantially filling said hollow, said amine curable polymer or prepolymer also located between said patch and said article in said juxtaposition area, said amine curable polymer or prepolymer filling said hollow having a rubber filler therein;

(e) said amine curable polymer or prepolymer bonded to said patch and said hollow at ambient temperature.

In general, another aspect of the invention is a process for repairing a cured, reinforced elastomer article, comprising the steps of:

(a) applying a treating agent to a hollow in the elastomer article, to a patch area and to a cured elastomer patch, said patch area located on at least one side of said article and juxtaposition to said hollow, said elastomer having unsaturated groups therein, said treating agent selected from the group consisting of N-halohydantoins, N-haloamides, N-haloimides, and combinations thereof;

(b) applying said patch juxtaposition to said patch area;

(c) applying an amine curable polymer or prepolymer system to said patch area between said patch and said article; and (d) applying an amine curable polymer or prepolymer system having a rubber filler therein to said hollow; and (e) curing said amine curable polymer or prepolymers at ambient temperature.

In general, another aspect of the invention is a repaired elastomer article, comprising:

(a) the elastomer article, said elastomer having unsaturated groups therein, said article being cured and having a cut therein;

(b) a treating agent, said treating agent coating said cut, said treating agent selected from the group consisting of N-halohydantoins, N-haloamides, N-haloimides, and combinations thereof;

(c) an amine curable polymer or prepolymer, said amine curable polymer or prepolymer substantially filling said cut, said amine curable polymer or prepolymer having a rubber filler therein;

(d) said amine curable polymer or prepolymer bonded to said elastomer article at ambient temperature.

BEST MODE FOR CARRYING OUT THE INVENTION

According to the concepts of the present invention, an elastomer article having a deformity therein is substantially filled with an amine curable polymer or prepolymer. If the deformity is a cut, the amine curable polymer or prepolymer has a rubber filler therein. If the deformity is a hollow such as a cavity or an aperture, a cured elastomer patch is utilized in association with the repair and is located juxtaposition to said aperture. The amine curable polymer or prepolymer in the hollow area will have a rubber filler therein. However, such polymer or prepolymer when utilized in the patch area will have no such filler. In either situation, cure of the amine curable polymer occurs at ambient temperature.

Generally, the article to be repaired has cords or reinforcement therein. When the article has a hollow therein, that is a recess or void, such hollow extends at least 25 percent into the reinforcement area such that some of the cords are broken, severed, damaged, or the like. When the cavity so extends only into the cord area, the cavity is formed in the article. When the hollow extends entirely through the article, an aperture is formed.

Figure 1:
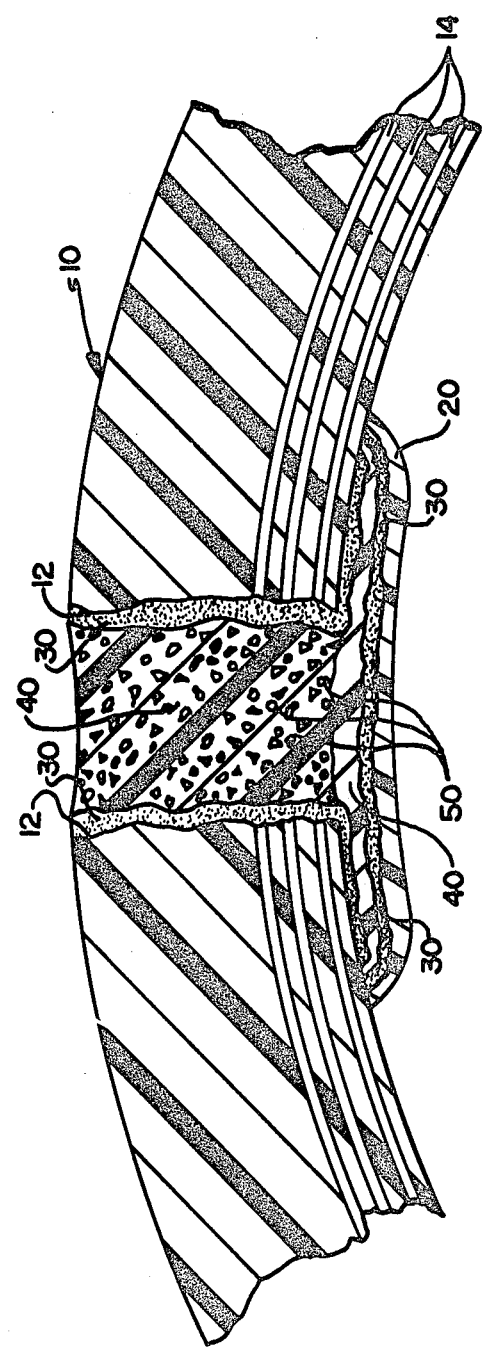
FIG. 1 relates to a cross-sectional view showing the repair of a reinforced, elastomeric article having an aperture therethrough, according to the present invention.
Figure 2:
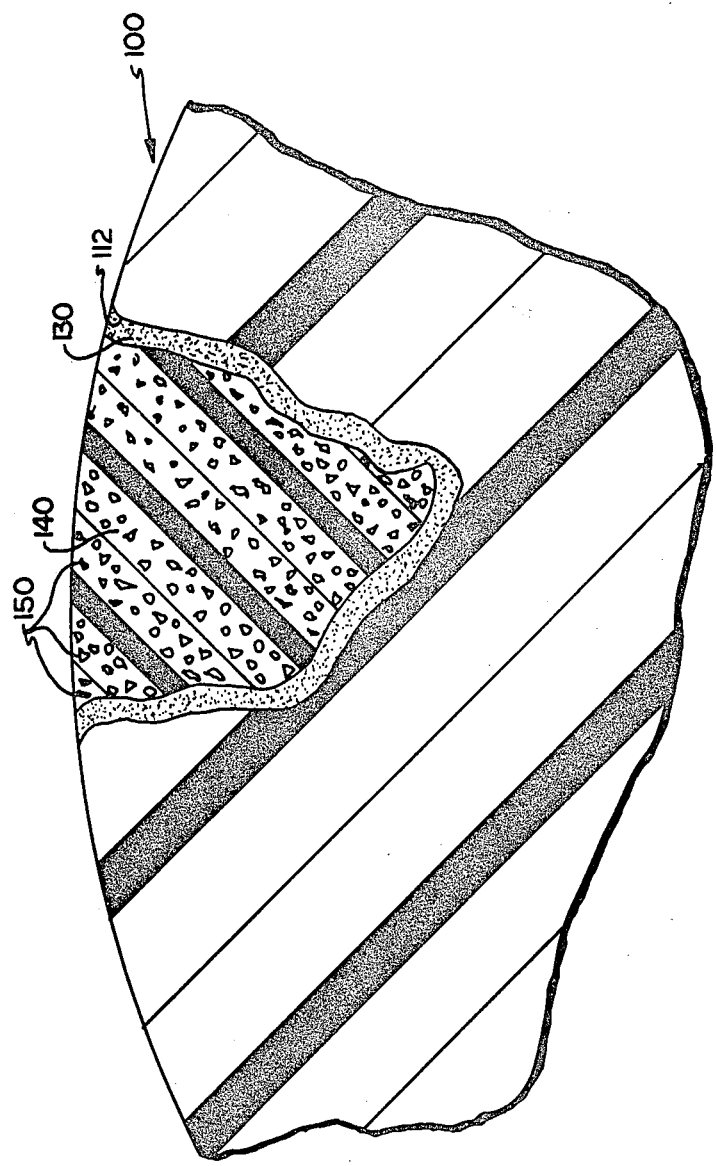
FIG. 2 relates to a cross-sectional view showing the repair of an elastomer article having a cut therein, according to the present invention.
Figure 3:
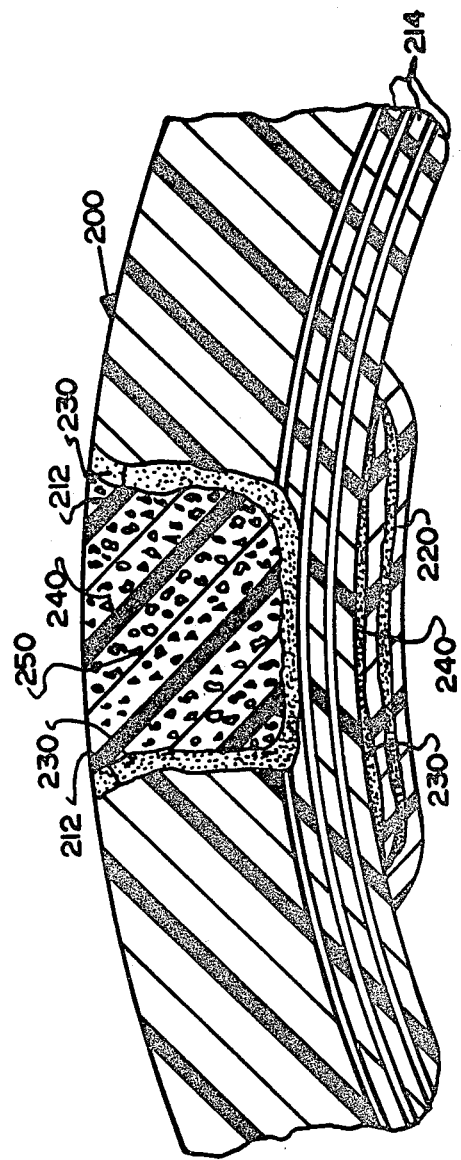
FIG. 3 relates to a cross-sectional view showing the repair of a reinforced elastomer article having a cavity therein, according to the present invention.

Considering an elastomer article having an aperture therethrough, as shown in FIG. 1, the article is generally indicated by the numeral 10. Aperture 12 extends entirely through the article. The article to be repaired, or substrate is a cured rubber or elastomer having unsaturated groups therein. The article typically has cords 14 therein. In the embodiment of FIG. 2, a cured rubber article having unsaturated groups therein is generally indicated by the number 100. The cut area 112 has a treating agent 130 thereon. The cut is substantially filled with said amine curable polymer or prepolymer. In the embodiment of FIG. 3, cavity 212 extends into the reinforcement portion of the article, generally indicated by the number 200. Article 200 also has unsaturated groups therein. Regardless of the nature of the opening, the substrate can be any conventional elastomer or rubber known to those skilled in the art. For example, it can be made from conjugated dienes having from 4 to 12 carbon atoms such as butadiene, isoprene, and the like. It can also be made from natural rubber, that is from a substance which is obtained from various trees and plants which grow in the tropics or desert portions of the world. Such natural rubber generally has in excess of 90 and usually in excess of 95 percent of cis-1,4-polyisoprene content. The substrate may also be various elastomeric copolymers such as those made from monomers of conjugated dienes having from 4 to 12 carbon atoms as set forth above, and vinyl substituted aromatic compounds having from 8 to 15 carbon atoms. Examples of such vinyl substituted aromatic compounds include styrene, alpha-methylstyrene, and the like. An example of a specific copolymer is styrene-butadiene rubber.

Naturally, other types of rubber compounds can be utilized such as the so-called butyl rubbers, neoprene, that is polychloroprene, and the like.

The preparation of such above-noted various elastomers is well known to the art. The article to be repaired is often in the form of a tire, especially an off-the-road tire or any rubber article having a cut or a hollow therein. Regardless of the type or nature of the article in which the elastomer exists as a cured form, it is desirable to clean the surface to which the amine curable polymer is to be applied. Cleaning can take place as through a physical treatment of the area to be repaired, for example as through buffing or through skiving, that is cutting and removing a portion of the surface. Another method involves the use of any conventional organic solvent to remove dirt and residue. Typical solvents include acetone, or ethyl acetate. As apparent from FIG. 1, the area which is typically cleaned involves aperture 12 the area adjacent to patch 20 and the patch as well. Thus, the aperture which may be difficult to clean by physical means, can be cleaned by utilizing a solvent whereas the bottom portion of the article can be buffed. To ensure removal of all loose rubber, the buffed portion can then be cleaned with a solvent. With regard to FIG. 2, cut 112 is cleaned as by a solvent or buffing as dictated by its size and shape.

To the cleaned surfaces are applied a coating of various treating agents 30, 130, or 230 which have been found to improve adhesion between the substrate and the rubber filled amine curable polymer or prepolymer 40, 140, or 240, respectively. Suitable treating agents include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various mono-, di-, and trichloro-s-triazinetriones, commonly known as mono-, di-, and trichloroisocyanuric acid. A preferred treating composition for use in the practice of the present invention are the various mono-, di-, or trichloro-s-triazinetriones, or combinations thereof. Trichloro-s-triazinetrione (trichloroisocyanuric acid) is especially preferred.

The treating agents usully exist in solid form. They are readily soluble in solvents such as acetone and the like and thus can be applied in liquid form. Application of the treating agent generally occurs at ambient temperatures. Application can occur through any conventional manner as through brushing, spraying, and the like. The amount applied is such that the rubber substrate surface is coated. Preferably, two or more coats of the treating agent or adhesive compound is used to ensure that all the cured rubber substrate surface has been coated.

A typical amount of the treating agent in the suitable solvent, for example ethyl acetate or acetone is generally from about 0.1 to about 10 percent by weight based upon the total weight of said treating agent and solvent, and preferably from about 0.5 percent to about 5 percent. Of course, higher or lower concentrations can be utilized. This solvent system has been found to dry within a matter of minutes so that the amine curable polymer or prepolymer can be bonded thereto. It is thought that the adhesive treating system adds halogen groups, for example, chlorine to the cured rubber which activates the cured rubber surface so that the amine curable polymer or polymer system forms a strong bond.

Of the various amine curable polymers or prepolymers, the urethanes are preferred. Other prepolymers or polymers which can be cured with the amine curing agent include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212-221; halogen-containing hydrocarbon polymers such as chloroprene polymers, chlorinated butyl rubber, and chlorinated polyethylene and polypropylene; chlorosulfonated polymers such as those described in U.S. Pat. No. 2,723,257; polymers containing acid halide groups such as

and haloformate groups such as

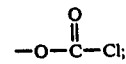

polymers containing anhydride groups which on reaction with diamines yield amide-acid linkages, and organo-polysiloxanes as described in U.S. Pat. No. 2,938,010.

The urethane prepolymers or polymers, that is those which contain isocyanate groups, are generally formed by first reacting a polyether polyol or a polyester polyol with a molar excess of a diisocyanate to form a prepolymer having terminal isocyanate groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester-based coating polymer with approximately 2.4 percent isocyanate end groups, manufactured by American Cyanamid. Blends of these polyurethanes can also be utilized. Moreover, it has been found, particularly with repair or application of the amine curable polymer to the patch area, that is the area between patch 20 and cured substrate 11, better adhesion is often obtained by utilizing two different types of urethane. For example, a urethane containing a high amount by weight of isocyanate end groups such as Adiprene L-367 can be blended with a urethane containing a low amount by weight of isocyanate end groups such as Adiprene L-42. The amount of one urethane to the other can range from about 1 to about 99 percent and desirably from about 30 to about 70 percent by weight.

To the amine curable prepolymer or polymer compound is added a conventional amine curing agent, known to those skilled in the art. Generally, any conventional or known amine curing agent can be used and, thus, only a few specific examples will be given. Thus, the curing agent can be MOCA, that is 4,4'-methylene bis(2-chloroaniline) or, desirably a complex of 4,4'-methylene dianiline and a salt, or a complex of racemic 2,3-di-(4-aminophenyl) butane and a salt, as set forth in U.S. Pat. No. 3,755,261 to VanGulick which is hereby fully incorporated by reference. The latter two complexes are preferred. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes or salts derived from 4,4'-methylene dianiline are highly preferred. Another class of amine curing agents which can be utilized are the various Versamides, that is the condensation products of polyamines and dibasic acids obtained when certain unsaturated fatty acids are polymerized, and are manufactured by The Henkel Chemical Company.

The equivalent weight of the curing agent utilized with regard to the curable prepolymer or polymer, including the amine curing agent, generally ranges from about 85 percent to 115 percent with from about 95 to 105 percent being preferred.

Often to facilitate processing, the curing agent, and especially an amine curing agent such as the complex of 4,4'-methylene dianiline and a salt is utilized with a plasticizer such as dioctylphthalate on a 50 percent weight basis, or Flexol 4-GO, tetraethylene glycol bis(2-ethyl hexanoate) manufactured by Union Carbide Corporation on a 50 percent weight basis. The amount of plasticizer can range from about 20 percent to about 60 weight percent.

The curing agent is blended with the prepolymer or polymers in various mixers such as dough mixers, high speed impellers, paddle-type mixers, and the like. Small batches can be mixed by stirring with a spatula. Usually, the prepolymer or polymer is a liquid. If not, when mixed with the polar solvent, a liquid mixture results. However, even if a solid curing agent is used, when added to the prepolymer or the polymer, and to a solvent system, a liquid system results even though the curing agent (e.g., amine) can be in the form of a dispersion. Thus, even though the system may contain solids therein, the solids exist in the form of a dispersion so that a liquid system is produced.

The curing agent and the amine curable polymers or prepolymers form the curable polymer system which is mixed with a polar solvent so that a liquid system is obtained which cures at ambient or room temperature, that is, the prevailing temperature as from about 10° C. to about 50° C. Often the ambient temperature will range from about 15° C. to about 35° C. or 40° C. The polar solvents which can be utilized, especially with the amine curing agent and the amine polymers or prepolymers are, for example, set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred. The amount of curing agent, based upon said polymer or prepolymer, ranges from about 0.85 to about 1.15 eqivalents.

An important aspect of the present invention relates to the use of a rubber filler 50 in the amine curable polymer or prepolymer to repair aperture 12. As previously noted, the patch area preferably does not have any rubber fillers therein since such fillers will appreciably weaken the adhesive bond of the amine curable polymer or prepolymer. Moreover, cut 112 and cavity 212 do have a rubber filler in the amine curable polymer or prepolymer. Filler 50, 150, or 250 is preferably a cured rubber and is in the form of particles. Desirably, the particle size can range from about 10 millimeters to about 0.01 (dust size) and preferably from about 1.0 millimeter to about 0.01 millimeter (dust size). Generally, any type of synthetic rubber can be utilized as the particle filler so long as it is an unsaturated rubber. A class of suitable rubber compounds include the same types of rubbers as that utilized in the article or substrate 10 or 100. That is, conjugated dienes having from 4 to 12 carbon atoms, natural rubber, typically containing in excess of 90 or 95 percent cis-1,4-polyisoprene, copolymers made from dienes having from 4 to 12 carbon atoms and vinyl substituted aromatics having from 8 to 15 carbon atoms, for example, styrene-butadiene rubber, the various types of nitrile rubber, polychloroprene, and the like. Although saturated type rubbers can also be utilized, the unsaturated types give better adhesion and thus are preferred.

The cured rubber source can be any conventional or common source such as ground tire scrap, ground rubber scrap, ground tire tread, and the like. The rubber source can also be in the form of a powder such as that obtained by buffing a tire. As should be apparent, such sources are very economical and will generally include specific rubbers such as polybutadiene, natural rubber, styrene-butadiene rubber, synthetic polyisoprene, and combinations thereof.

The amount of rubber utilized in the amine curable polymer or prepolymer ranges from about 10 to about 75 percent by weight, and preferably from about 40 to about 50 percent by weight, with an optimum amount being approximately 43 percent by weight based upon the total amount of said amine curable polymer or prepolymer and said cured rubber particles. Generally, the addition of the rubber particles to the amine curable polymer or prepolymer will make such polymer softer as well as reduce its modulus. The hardness of the amine cured polymer or prepolymer 40, 140, or 240 containing rubber particles therein in aperture 12, cut 112, or cavity 212, respectively, can thus be varied by the type of rubber utilized as well as the amount thereof. Depending upon the repaired article, a desired hardness of the cured rubber-amine cured polymer or prepolymer mixture will vary. It is desirable that the hardness of the rubber particle-amine cured polymer or prepolymer mixture is generally similar or equal to that of substrate 10, 100, or 200. With regard to a tire, such hardness generally ranges from about 40 to about 90 on the Rockwell Shore A hardness scale, and preferably from about 60 to about 70. The low strain (lbs./in.$^2$) modulus will generally range from about 25 to about 500, and preferably from about 50 to about 75. Not only does such rubber particle-amine cured polymer or prepolymer mixture result in improved performance with regard to a repaired article, but the material costs of the filled aperture is reduced.

The cured rubber particles can be added to the amine curable prepolymer or polymer system at any stage and blended or mixed therewith utilizing any conventional mixing device as for example a spatula, a mixer, and the like.

Considering patch 20 of the aperture embodiment, it can generally be of any desired size so long as it is greater in surface area than the aperture adjacent thereto. Typically, the surface area of the patch is at least twice as great as the aperture. Generally, an appropriate patch size will be known to one skilled in the art of patch construction and/or patch application. The patch is made of any conventional rubber and is generally fully cured. Although a cured natural rubber or a composition containing at least 80 percent by weight of natural rubber is often preferred, any conventional type of cured rubber compound can be utilized. Thus, the patch can be made from a conjugated diene having from 4 to 12 carbon atoms, copolymers made substantially from conjugated dienes having from 4 to 12 carbon atoms with vinyl substituted aromatics having from 8 to 15 carbon atoms, for example styrene-butadiene rubber, and the like. In essence, the patch can be made out of the same type of rubber as the substrate and may have other types of rubber therein. Often, the patch will have a cushioned layer thereon to alleviate stresses formed between the tire carcass and the patch.

Since in the preferred embodiment of the present invention the substrate has cords therein, desirably the patch also has cords therein, not shown. Although the number of cords can range from a small number to a very large number, the number of cords is generally equal to the strength the cords contained in the substrate. Such a provision provides an adequate reinforcement for the article. The cords can be made of polyester, nylon, steel, rayon, and the like, with nylon being preferred. It has been found that according to the present invention, large apertures extending through a cured rubber substate can be repaired up to approximately eight inches in diameter.

Generally, any rubber article having a cut, cavity, or an aperture therethrough can usually be repaired by the present invention. Specific examples include tires, especially off-the-road tires such as those utilized for front-end loaders, mining equipment machines, and the like. Repaired articles are shown in the drawings. FIG. 1 relates to a tire having an aperture therethrough and is repaired utilizing patch 20. Patch 20 will have cords therein, not shown. FIG. 2 relates to an opening in the form of a cut as in a tire. The opening can be on the tread area or the sidewall. FIG. 3 relates to a cavity extending into cords 214 of a tire.

When the rubber article is a tire and the deformity is an aperture, as in FIG. 1, usually the patch area is buffed sufficiently to remove surface contamination. The inner liner should at least be buffed and in some cases removed to the tie-gum layer in order to obtain a fresh surface. Occasionally, at times, it is desirable to even remove one or two of the cord plies in order to ensure a fresh surface for bonding. Reinforcing patch 20 can contain a plurality of cords therein (not shown), generally approximately in strength to the cords in the tire to be repaired. The patch is coated with treating agent 30 and then coated with amine curable polymer or prepolymer 40 having no rubber filler therein. The patch is then taped into place over the aperture area. The patch is also held in place by inflating a curing tube located on the inside of the tire. With the aperture of the tire located in the uppermost vertical position, the amine curable polymer or prepolymer having rubber filler 50 therein is poured into the aperture until it is filled. Of course, the aperture has previously been coated with treating agent 30. The top of the aperture is then taped and the amine curable polymer in the patch area and in the aperture is allowed to cure at ambient temperature. Taping of the aperture area retains the polar solvent such as acetone which promotes curing of the polymer. In a variation of this procedure, the amine curable polymer is applied to the patch area and then the patch applied thereto. The patch is taped into place and the polymer is allowed to cure. Next, the amine curable polymer 40 having filler 50 therein is separately added to the aperture so that it is filled and then taped thereover. The aperture portion of the repair is then separately cured at ambient temperature.

With regard to the embodiment of FIG. 2, article 100 is rotated until the cut is located in the uppermost portion and then filled. The amine curable polymer 140 having rubber fillers 150 therein is preferably covered, as by tape, and allowed to cure at ambient temperature.

Considering the embodiment of FIG. 3, it is similar to FIG. 1 in that the hollow, in the form of a cavity, is filled in association with a patch. More specifically, whenever approximately 25 to about 50 percent of cords 214 are severed, broken, or otherwise damaged, the strength of the cords in patch 220 (not shown) is approximately equal to the preinjury strength of the damaged cords. However, should the number of damaged, severed, or broken cords be approximately 50 percent to 100 percent, the total strength of the cords in the patch is approximately equal to at least the total strength of the cords in the article. The repair of an article having a cavity therein, such as in FIG. 3, generally proceeds in the same manner as in the embodiment of FIG. 1. That is, article 200 is buffed or otherwise cleaned such that one or two of the cords are exposed. The patch area located juxtaposition to cavity 212 is coated with treating agent 230 as is patch 220. Then, an amine curable polymer or prepolymer is applied to the patch and the patch then applied to the article and held in place as by taping. The size of the patch is that as discussed above. As in the embodiment of FIG. 1, the article is then rotated until the cavity is in the uppermost position and then the amine curable polymer having filler 250 therein is applied to the cavity which has previously been treated with treating agent 230. The cavity portion is then taped and allowed to cure with the patch portion. Alternatively, the patch can be separately applied and cured as can the amine curable polymer or prepolymer-filler mixture applied to the cavity. As noted above, when generally about 25 to about 50 percent of the cords are broken or damaged, the strength of the cords in patch 220 is approximately equal to the prestrength of the broken cords. However, when approximately 50 percent or greater of the cords are broken, the strength of the cords of the patch is substantially equal to or greater than the total strength of cords 214 in article 200.

The end result is a repaired article being prepared by an easier method and having equivalent or better strength and durability than that repaired according to heretofore conventional methods that are performed on site. Moreover, the hardness and/or modulus of the repair is similar to the substrate and thus results in improved performance.

In forming the amine curable polymer system, generally the amine curable polymer or prepolymer is mixed with the polar solvent and then the curing agent is added last. As previously noted, the rubber particles can be added at any stage. During cure, an effective and strong bond is formed between the prepolymer or polymer system with the treated elastomer substrate and the previously cured rubber particles. Since the present invention relates to an ambient temperature, repair of large and cumbersome articles such as off-the-road tires, and the like, can be made in situ. In other words, the repair can be made at the job site. The only accessory which may be required is a tire bladder, although a sand bag can be used. In such a situation, the repair can be made at the local tire repair shop. Since the cure is ambient, no steam chambers, or other vulcanizable tire repair equipment are required. This, of course, also results in an energy savings.

It is to be understood that various conventional additives in typical amounts can be added to the amine curing agent and prepolymer system such as colorants, softeners, fillers, antioxidants, plasticizers, and the like.

The invention will be better understood by reference to the following representative examples.

EXAMPLE 1

An exterior cut in a tire 36.00×51 hauler tire (OTR, off-the-road) was repaired in the following manner using the composite type urethane repair. The cut (commonly known as a spot repair) was buffed thoroughly, making sure the injury was free of any loose rubber particles or cuts or gouges. It was buffed to an RMA #3 or #4 buff rating. The cut was washed thoroughly with acetone on a piece of Rymplecloth. The acetone was allowed to dry completely. The surface was then coated with several coats of a 3 percent trichloro-s-triazinetrione in ethyl acetate allowing each coat to dry before the next coat was applied. After the last coat had dried, a composite kit was mixed and poured or placed into the cut. The composite kit consisted of three components.

| COMPONENT A | COMPONENT B | COMPONENT C |
| --- | --- | --- |
| Adiprene L-42 (100 gm) Flexol 4GO (10 gm) Acetone (10 gm) | Caytur 21 (14.3 gm) | Treated Rubber (100 gm) |

The treated rubber was tread rubber from passenger and truck tires (both natural and synthetic rubber) that was graded to remove large chunks of rubber and then washed with acetone (slurried), dried and treated with a dilute solution of trichloro-s-triazinetrione in ethyl acetate (slurried). The rubber was separated from the primer and dried overnight at room temperature and then at 100° C. for one hour.

The mixing procedure consisted of mixing component C with component A, thoroughly; then mixing component B with the mixture of A and C. The mixed material was then added to the cut by means of a spatula. The surface was taped in order to promote the ambient cure by containing the acetone. The repair was allowed to cure for 24 hours at ambient temperature. After the required time of cure, the tape was removed and the tire was ready for service.

After 973 hours of testing, the repair was better than a control.

EXAMPLE 2

A 10.00×20 Load Range F, 8-ply, Transport 1 Truck tire having a ¾ inch injury in the crown area and extending into the cord area was repaired as follows: The injury was buffed to an RMA #3 or #4 buff rating using a tungsten-carbide tip tool. The innerliner was then buffed down to the top body ply in the same manner. The innerliner was buffed out only as large as the patch to be used. The patch was used as a template and was also buffed on the side to be adhered to the tire. All buffed areas were then washed thoroughly using acetone on a piece of Rymplecloth. The solvent was allowed to dry thoroughly (10–15 minutes). The buffed and clean surfaces were next treated with two coats of 3 percent trichloro-s-triazinetrione in ethyl acetate, allowing the first coat to dry before the second coat was added. The patch was also coated with two coats of the 3 percent trichloro-s-triazinetrione. The patch was installed first. A standard 50/50 kit was used. It contained the following ingredients:

| | | |
| --- | --- | --- |
| Adiprene L-42 | 75 gm. | |
| Adiprene L-367 | 75 gm. | A-Side |
| Flexol 4GO | 15 gm. | |
| Acetone | 15 gm. | |
| Caytur 21 | 36 gm. | B-Side |

The two sides, A and B, were thoroughly mixed and then allowed to thicken to a nearly non-flowable state. At this point, the material was coated onto the patch (Rocson Patch ROCO 8-4) and onto the innerliner area. The patch was put in place and held in position with tape. A tube was inserted and inflated to hold the patch in position and to apply pressure on it. The tire was then rotated so that the injury was located at the top. A composite system was mixed. It had the following formulation:

| | |
| --- | --- |
| Adiprene L-42 | 25 gm. |
| Acetone | 2.5 gm. |
| 4GO | 2.5 gm. |
| Ground Scrap Rubber Treated* | 25 gm. |
| Caytur 21 | 3.6 gm. |

*The ground scrap rubber was graded to a No. 20 mesh, slurried with acetone, drained and dried. It was then treated briefly with a 0.25 percent trichoro-s-triazinetrione in ethyl acetate solution, drained, and dried at 100° C. for 10 minutes. It was stored in a jar and kept capped until used.

The composite formulation was mixed thoroughly and placed into the injured area. The repaired area was covered with tape and allowed to cure for 24 hours at room temperature. After the 24 hour cure period, the tape and tube were removed from the tire. Both the patch and spot looked excellent. The tire was tested on a crown break test (a stepwise increase in speed under a loaded condition). The tire ran 1,245 miles. It was removed at a duration of 3 hours at 70 mph. This was considered an excellent result for this type of severe test on a repaired tire.

While various preferred embodiments of the present invention, as well as the best mode thereof have been described in detail, in accordance with the patent statutes, it is to be understood that the invention is measured by the attached claims.

What is claimed is:

1. A repaired, reinforced elastomer article wherein said repair contains a rubber filler in a cured amine curable prepolymer or polymer, comprising:
   (a) the elastomer article, said elastomer having unsaturated groups therein, said article being cured and having a hollow therein;
   (b) a cured elastomer patch having cords therein, said patch located juxtaposition to said hollow;
   (c) a treating agent, said treating agent coating said hollow and said article in said patch juxtaposition area, said treating agent selected from the group consisting of N-halohydantoins, N-haloamides, N-haloimides, and combinations thereof;
   (d) the amine curable polymer or prepolymer having the rubber filler therein, said amine curable polymer or prepolymer substantially filling said hollow, said amine curable polymer or prepolymer also located between said patch and said article in said juxtaposition area, wherein the amount of said rubber filler in said hollow is from about 10 percent to about 75 percent by weight based upon the weight of said amine curable polymer or prepolymer and said rubber filler and wherein said rubber filler particle size ranges from about 10 millimeters to about 0.01 millimeters;
   (e) said amine curable polymers or prepolymers bonded to said patch and said hollow at ambient temperature.

2. A repaired elastomer article according to claim 1, wherein said elastomer article has cords therein, wherein said patch has cords therein and wherein said ambient temperature is from about 10° C. to about 50° C., and wherein said rubber filler is made from monomers selected from the group consisting of a conjugated diene having from 4 to 12 carbon atoms, natural cis-1,4-polyisoprene, copolymers made from dienes having from 4 to 12 carbon atoms and vinyl substituted aromatics having from 8 to 15 carbon atoms, nitrile rubber and polychloroprene.

3. A repaired elastomer article according to claim 2, wherein said amine curable polymer or prepolymer is selected from the group consisting of (a) epoxy resins; (b) halogen-containing hydrocarbon polymers; (c) chlorosulfonated polymers; (d) polymers containing said halide groups such as

or haloformate groups such as

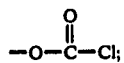

(e) polymers containing anhydride groups which, on reaction with diamines, yield amide-acid linkages; (f) organopolysiloxanes; (g) urethane polymers or prepolymers, and combinations thereof, and wherein said treating agent is selected from the group consisting of 1,3-dichloro-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; and N-bromosuccinimide, and mono-, di-, or trichloro-s-triazinetrione.

4. A repaired elastomer article according to claim 3, wherein said treating agent is selected from the group consisting of monochloro-s-triazinetrione, dichloro-s-triazinetrione, trichloro-s-triazinetrione, and combinations thereof, and wherein the amount of said rubber particles ranges from about 40 percent to about 50 percent.

5. A repaired elastomer article according to claim 4, wherein said amine cured polymer or prepolymer is said urethane polymer or prepolymer, and wherein said rubber particle size ranges from about 1.0 millimeter to about 0.01 millimeter, and wherein said ambient temperature ranges from about 15° C. to about 35° C.

6. A repaired article according to claim 5, wherein said hollow is an aperture and wherein the strength of said cords in said patch is approximately equal to or greater than the strength of the cords in said elastomer article.

7. A repaired elastomer article according to claim 5, wherein said hollow is a cavity having from about 25 to about 50 percent of the cords therein damaged, and wherein the strength of the cords in said patch is approximately equal to the prestrength of said cords before being damaged.

8. A repaired elastomer article according to claim 5, wherein said hollow is a cavity having from about 50 percent to about 100 percent of the cords therein damaged, and wherein the strength of the cords in said patch is about equal to or greater than the strength of the cords in said article.

9. A process for repairing a cured, reinforced elastomer article wherein said repair contains a rubber filler in an amine curable polymer or prepolymer, comprising the steps of:
   (a) applying a treating agent to a hollow in the elastomer article to a patch area and to a cured elastomer patch, said patch area located on at least one side of said article and juxtaposition to said hollow, said elastomer having unsaturated groups therein, said treating agent selected from the group consisting of N-halohydantoins, N-haloamides, N-haloimides, and combinations thereof;
   (b) applying a patch having cords therein juxtaposition to said patch area;
   (c) applying an amine curable polymer or prepolymer system to said patch area between said patch and said treating agent;
   (d) applying an amine curable polymer or prepolymer having a rubber filler therein to said hollow wherein the amount of said rubber filler is from about 10 percent to about 75 percent by weight based upon the weight of said amine curable polymer or prepolymer and said rubber filler, and wherein said rubber filler particle size ranges from about 10 millimeters to about 0.01 millimeters, and
   (e) curing said amine curable polymer or prepolymers at ambient temperature.

10. A process according to claim 9, wherein said article has cords therein, wherein said ambient temperature cure is from about 10° C. to about 50° C.

11. A process according to claim 10, wherein said amine curable polymer or prepolymer system comprises a polar solvent, an amine curable polymer or prepolymer, and an amine curing agent, said polar solvent is selected from a compound having dipole moments in excess of 0.4 debye in which there are no more than a total of 8 CH₃—, CH₂, or tertiary carbon radicals per polar group contained in said compound, benzene, and biphenyl; and said amine curable polymer or prepolymer is selected from the group consisting of (a) epoxy resins; (b) halogen-containing hydrocarbon polymers; (c) chlorosulfonated polymers; (d) polymers containing acid halide groups such as

and haloformate groups such as

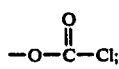

(e) polymers containing anhydride groups which, on reaction with said diamines, yield amide-acid linkages; (f) organopolysiloxanes and (g) urethane polymers or prepolymers.

12. A process according to claim 11, wherein said treating agent is selected from the group consisting of 1,3-dichloro-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; N-bromosuccinimide, mono-, di-, or trichloro-s-triazinetrione.

13. A process according to claim 12, wherein said treating agent is selected from the class consisting of monochloro-s-triazinetrione, dichloro-s-triazinetrione, trichloro-s-triazinetrione, and combinations thereof, and wherein said polar compound ranges from about 2 to about 40 parts per 100 parts of said prepolymer or polymer and is selected from the group consisting of esters, ketones, ethers, halogenated hydrocarbons, tertiary amines, nitrile paraffins, fully substituted amides, sulfones, sulfoxides, and sulfides, wherein said amine curable polymer or prepolymer is said urethane polymer or prepolymer, wherein the amount of said rubber particles ranges from about 40 percent to about 50 percent by weight, and wherein said particle size ranges from about 1.0 millimeter to about 0.01 millimeter.

14. A process according to claim 13, wherein said polar solvent is selected from the group consisting of dimethylformamide, tetrahydrofuran, cyclohexanone, ethyl acetate, methyl ethyl ketone, and acetone, and wherein said amine curing agent is selected from the group consisting of (a) 4,4'-methylene bis(2-chloraniline), (b) a complex of 4,4'-methylene dianiline and a salt, said salt being selected from the group consisting of sodium chloride, sodium bromide, sodium iodide, sodium nitrite, lithium chloride, lithium bromide, lithium iodide, lithium nitrite, and sodium cyanide, (c) a complex of racemic 2,3-di-4(aminophenyl)butane with a salt, said salt selected from the group consisting of sodium chloride, sodium bromide, sodium iodide, potassium chloride, potassium bromide, potassium iodide, cesium chloride, cesium bromide, and cesium iodide, the ratio of said dianiline or said butane to said salt in said complex being 3 moles to 1 mole, the equivalent amount of said curing agent based upon said prepolymer or polymer ranging from about 0.85 to about 1.05 equivalents.

15. A process according to claim 14, wherein said hollow is a cavity extending into said cords such that at least about 25 percent thereof are damaged, or an aperture extending therethrough.

16. A repaired elastomer article wherein said repair contains a rubber filler in a cured amine curable prepolymer or polymer comprising:
 (a) the elastomer article, said elastomer having unsaturated groups therein, said article being cured and having a cut therein;
 (b) a treating agent, said treating agent coating said cut, said treating agent selected from the group consisting of N-halohydantoins, N-haloamides, N-haloimides, and combinations thereof;
 (c) a cured amine curable polymer or prepolymer having the rubber filler therein, said amine curable polymer or prepolymer substantially filling said cut; wherein the amount of said rubber filler in said amine curable polymer or prepolymer is from about 10 percent to about 75 percent by weight based upon the weight of said amine curable polymer or prepolymer in said rubber filler, and wherein said rubber filler particle size is from about 10 millimeters to about 0.01 millimeters;
 (d) said amine curable polymer or prepolymer bonded to said elastomer article at ambient temperature.

17. A repaired elastomer article according to claim 16, and wherein said ambient temperature cure is from about 10° C. to about 50° C.

18. A repaired elastomer article according to claim 17, wherein said amine curable polymer or prepolymer is selected from the group consisting of (a) epoxy resins; (b) halogen-containing hydrocarbon polymers; (c) chlorosulfonated polymers; (d) polymers containing said halide groups such as

or haloformate groups such as

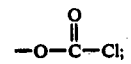

(e) polymers containing anhydride groups which, on reaction with diamines, yield amide-acid linkages; (f) organopolysiloxanes; (g) urethane polymers or prepolymers, and combinations thereof, and wherein said treating agent is selected from the group consisting of 1,3-dichloro-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; and N-bromosuccinimide, and mono-, di-, or trichloro-s-triazinetrione.

19. A repaired elastomer article according to claim 18, wherein said treating agent is selected from the group consisting of monochloro-s-triazinetrione, dichloro-s-triazinetrione, trichloro-s-triazinetrione, and combinations thereof, and wherein the amount of said rubber particles ranges from about 40 percent to about 50 percent.

20. A repaired elastomer article according to claim 19, wherein said amine cured polymer or prepolymer is said urethane polymer or prepolymer, and wherein said rubber particle size ranges from about 1.0 millimeter to about 0.01 millimeter, and wherein said ambient temperature ranges from about 150° C. to about 35° C.

21. A repaired, reinforced elastomer article wherein said repair contains a rubber filler in an amine curable prepolymer or polymer comprising:
 (a) the elastomer article, said elastomer having unsaturated groups therein, said article being cured and having a hollow therein;
 (b) a cured elastomer patch, said patch having cords therein, said patch located juxtaposition to said hollow;
 (c) a treating agent, said treating agent coating said hollow and said article in said patch juxtaposition area, said treating agent selected from the group consisting of N-halohydantoins, N-haloamides, N-haloimides, and combinations thereof;
 (d) the amine curable polymer or prepolymer having the rubber filler therein, said amine curable polymer or prepolymer substantially filling said hollow, said amine curable polymer or prepolymer also located between said patch and said article in said juxtaposition area, wherein the amount of said rubber filler in said hollow is from about 10 percent to about 75 percent by weight based upon the weight of said amine curable polymer or prepolymer and said rubber filler and wherein said rubber filler particle size ranges from about 10 millimeters to about 0.01 millimeters; said rubber filled amine curable polymer or prepolymer having a shore A hardness from about 40 to about 90 and a modulus of from about 25 to about 500;
 (e) said amine curable polymers or prepolymers bonded to said patch and said hollow at ambient temperature.

* * * * *